(12) United States Patent
Yoshioka

(10) Patent No.: US 8,189,867 B2
(45) Date of Patent: May 29, 2012

(54) LEARNING METHOD FOR ARTICLE STORAGE FACILITY

(75) Inventor: Hideo Yoshioka, Higashiomi (JP)

(73) Assignee: Daifuku Co., Ltd., Osaka (JP)

( * ) Notice: Subject to any disclaimer, the term of this patent is extended or adjusted under 35 U.S.C. 154(b) by 483 days.

(21) Appl. No.: 12/564,564

(22) Filed: Sep. 22, 2009

(65) Prior Publication Data

US 2010/0080449 A1    Apr. 1, 2010

(30) Foreign Application Priority Data

Sep. 29, 2008    (JP) ................................. 2008-251036

(51) Int. Cl.
*G06K 9/00*    (2006.01)
(52) U.S. Cl. ........................................ 382/103; 348/143
(58) Field of Classification Search .................. 382/100, 382/103, 181, 190, 195; 348/135–143; 705/22
See application file for complete search history.

(56) References Cited

U.S. PATENT DOCUMENTS

| | | | | |
|---|---|---|---|---|
| 4,678,390 A | * | 7/1987 | Bonneton et al. ............. | 414/282 |
| 4,690,601 A | * | 9/1987 | Delius et al. ................ | 414/795.3 |
| 5,669,753 A | * | 9/1997 | Schween ...................... | 414/800 |
| 6,315,513 B1 | * | 11/2001 | Harukawa et al. ............ | 414/286 |
| 6,662,077 B2 | * | 12/2003 | Haag .............................. | 700/217 |
| 7,689,480 B2 | * | 3/2010 | Solomon ........................ | 705/28 |
| 8,041,102 B2 | * | 10/2011 | Yuyama et al. ............... | 382/142 |
| 2008/0213073 A1 | * | 9/2008 | Benedict et al. ............. | 414/279 |
| 2011/0123301 A1 | * | 5/2011 | Noble et al. ............ | 414/222.13 |

FOREIGN PATENT DOCUMENTS

| | | |
|---|---|---|
| JP | 06247507 | 9/1994 |
| JP | 2001158507 | 6/2001 |

* cited by examiner

*Primary Examiner* — Anand Bhatnagar
(74) *Attorney, Agent, or Firm* — The Webb Law Firm

(57) ABSTRACT

A learning method is disclosed for an article storage facility having an article storage rack including article storage units arranged in a rack lateral width direction and a vertical direction, a vertically movable lift, and a horizontal travel carriage associated with the vertically movable lift. A frontal view camera is positioned with respect to the article transfer device such as to capture an image of a detected member provided for each of the storage units from a rack fore-and-aft direction. An angular view camera is positioned with respect to the article transfer device such as to be displaced relative to the frontal view camera in the rack lateral width direction or the vertical direction and such as to capture an image of a detected member from a direction at an angle relative to the rack fore-and-aft direction. And vertical direction correction information, rack lateral width correction information and extending and retracting distance correction information are derived based from image information.

9 Claims, 9 Drawing Sheets

LEARNING METHOD FOR ARTICLE STORAGE FACILITY

BACKGROUND OF THE INVENTION

1. Field of the Invention

The present invention relates to a learning method for an article storage facility, more particularly, to a learning method for a facility having an article storage rack having article storage units arranged in a direction of rack lateral width and the vertical direction, a transporting device such as a vertically movable lift and a horizontal travel carriage, and an article transfer device supported by the transporting device.

2. Description of the Related Art

Such article storage facilities are configured to take articles in and out of storage units by moving an article support of article transfer means by a target distance in a fore and aft direction with respect to the rack with the article transfer means moved to the target stop position.

In such article storage facilities, because the target stop positions where the article transfer device is required to stop may be shifted in the direction of the rack lateral width, or the vertical direction with respect to the storage unit, and the target distances by which the article support is moved may be too large or small with respect to the distance from the article transfer device to the storage unit, due to positional variations of components that occur during assembly of the article storage rack and due to positional shifting of components in article transfer means, or the transporting device that occur with passage of time, it is necessary to correct target stop positions so that they become the proper positions for the storage units, and to correct the target distances so that they become the proper distances from the article transfer device to the storage units.

And a learning device in conventional article storage facilities includes a pair of imaging devices which are spaced apart from each other in the direction of the rack lateral width to capture an image of a detected member provided to each storage unit, and a learning control means for controlling the operation of the transporting device in order to move the article transfer means to target stop positions, for controlling the operation of the imaging device to capture the image of the detected member with the article transfer means located at the target stop position, and for correcting the target stop position and the target distance based on the image information of the image captured with the imaging device. The learning control means is configured to compute the three dimensional coordinates of the detected member based on the principle of stereovision from the parallax of the pair of pictures captured with the pair of imaging devices and to correct the target stop position in the rack lateral width direction and the vertical direction and the target distance based on this three-dimensional coordinates. (See, for example, JP Publication of Application No. 2001-158507.)

Incidentally, in the facilities in which the three-dimensional coordinates of the detected member are computed based on the principle of the stereo vision from the parallax of the pair of images as described above, the pair of imaging devices are either a pair of frontal view imaging devices which capture images of the detected member from the rack fore-and-aft direction, or a pair of angular view imaging devices which capture images of the detected member from the direction which is at an angle with respect to the rack fore-and-aft direction.

However, in the above-mentioned conventional article storage facilities, since the three-dimensional coordinates of the detected member are computed from the parallax of pair of images captured with the imaging devices based on the principle of the stereovision, and since the target stop position in the rack lateral width direction and the vertical direction and the target distance are corrected based on these three-dimensional coordinates, the calculations performed by the learning control means were complicated.

SUMMARY OF THE INVENTION

An object of the invention is to provide a learning method for an article storage facility that is capable of correcting the target stop positions and the target extending and retracting distance without involving complicated calculations.

To achieve the object, in a learning method according to the present invention for an article storage facility having an article storage rack including a plurality of article storage units arranged in a rack lateral width direction and in a vertical direction, and an article transfer device configured to be moved, by a vertically movable lift and a horizontal travel carriage associated with the vertically movable lift, to each of target stop positions, each of which is a position defined, in association with one of the plurality of the storage units, in the rack lateral width direction, the vertical direction, and a rack fore-and-aft direction, wherein an article is transferred to and from a storage unit by moving an article support provided to the article transfer device in the rack fore-and-aft direction by a target extending and retracting distance while the article transfer device is stopped at a target stop position, the method comprises:

positioning a frontal view camera with respect to the article transfer device such as to capture an image of a detected member provided in association with each of the storage units from the rack fore-and-aft direction, and such that, when the frontal view camera captures an image of the detected member while the article transfer device is assumed to be at a standard proper position relative to a storage unit with respect to each of the rack lateral width direction, the vertical direction, and the rack fore-and-aft direction, which is an appropriate position for an article transfer, the image of the detected member is located at a set reference position within the image taken;

positioning an angular view camera with respect to the article transfer device such as to be displaced with respect to the frontal view camera in a displacement direction which is either the rack lateral width direction or the vertical direction to capture an image of the detected member from a direction which is at an angle with respect to the rack fore-and-aft direction, and such that, when the angular view camera captures an image of the detected member while the article transfer device is assumed to be at the standard proper position relative to the storage unit, the image of the detected member is located at a set reference position within the image taken;

performing an imaging operation wherein the article transfer device is caused to be moved to the target stop position for each of the plurality of the storage unit in turn, and operations of the frontal view camera, the angular view camera and of at least one of the vertically movable lift and the horizontal travel carriage are controlled to cause the frontal view camera and the angular view camera to capture an image while the article transfer device is at the target stop position;

deriving rack lateral width direction correction information and vertical direction correction information for bringing the target stop position closer to the standard proper position in the rack lateral width direction and the vertical direction, and extending and retracting distance correction information for bringing the target extending and retracting distance closer to a proper extending and retracting distance based on an image information from the frontal view camera and an image information from the angular view camera, and performing a calculation to obtain the target stop position and target extending and retracting distance for each of the plurality of storage units based on the derived rack lateral width direction correction information, the vertical direction correction information, and the extending and retracting distance correction information;

wherein the vertical direction correction information is derived in the calculating step based on an amount of deviation between the set reference position and the position of the detected member, in a direction corresponding to the vertical direction, in the frontal view image captured by the frontal view camera, and the rack lateral width direction correction information is derived in the calculating step based on an amount of deviation between the set reference position and the position of the detected member, in a lateral direction corresponding to the rack lateral width direction;

wherein the extending and retracting distance correction information is derived based on the amount of deviation between the set reference position and the position of the detected member in a direction corresponding to the displacement direction in an image captured by the frontal view camera, the amount of deviation between the set reference position and the position of the detected member in a direction corresponding to the displacement direction in an image captured by the angular view camera, and angle of intersection information between an optical axis of the frontal view camera and an optical axis of the angular view camera.

That is, an imaging device includes a frontal view imaging camera which captures an image of the detected member provided in association with each storage unit from the rack fore-and-aft direction, and an angular view camera which is displaced relative to the frontal view camera in the rack lateral width direction or the vertical direction, and which captures an image of the detected member from a direction that is at an angle with respect to the rack fore-and-aft direction, such that the frontal view camera and the angular view camera are configured to move integrally with the article transfer device. Thus, by moving the article transfer device to the target stop positions for all or a part of the plurality of the article storage units of the article storage rack, the frontal view camera and the angular view camera are moved integrally therewith so that the frontal view camera and the angular view camera can capture images of the detected members in turn.

Since, the frontal view camera is positioned with respect to the article transfer device such that when the frontal view camera captures an image of the detected member while the article transfer device is assumed to be at a standard proper position relative to a storage unit with respect to each of the rack lateral width direction, the vertical direction, and the rack fore-and-aft direction, which is an appropriate position for an article transfer, the image of the detected member is located at a set reference position within the image taken, the image of the detected member would be at a position deviated from the set reference position in the image captured by the frontal view camera when the target stop position is deviated from the standard proper position in the rack lateral width direction and/or the vertical direction.

Similarly, since the angular view camera is positioned with respect to the article transfer device such that when the angular view camera captures an image of the detected member while the article transfer device is assumed to be at a standard proper position relative to a storage unit, the image of the detected member is located at a set reference position within the image taken, the image of the detected member would be at a position deviated from the set reference position in the image captured by the angular view camera when the target extending and retracting distance is deviated from an appropriate extending and retracting distance at the standard proper position.

And rack lateral width direction correction information and vertical direction correction information for bringing the target stop position closer to the standard proper position in the rack lateral width direction and the vertical direction are derived based on an image information from the frontal view camera, and the target stop position is derived for each of the plurality of storage units based on the derived rack lateral width direction correction information, and the vertical direction correction information.

More specifically, the vertical direction correction information is derived based on an amount of deviation between the set reference position and the position of the detected member, in a direction corresponding to the vertical direction, in the frontal view image captured by the frontal view camera, and the rack lateral width direction correction information is derived based on an amount of deviation between the set reference position and the position of the detected member, in a lateral direction corresponding to the rack lateral width direction in the frontal view image captured by the frontal view camera. And the target stop position for each of the plurality of storage units is derived based on the derived rack lateral width direction correction information, and the vertical direction correction information.

Therefore, the target stop position may be obtained from one image captured by the frontal view camera. Further, in deriving the target stop position, the rack lateral width direction correction information and the vertical direction correction information are derived by simple calculations based on the amount of deviation between the set reference position and the position of the detected member in a direction corresponding to the vertical direction and based on the amount of deviation between the set reference position and the position of the detected member, in the lateral direction, in the image captured by the frontal view camera to derive the target stop position.

And extending and retracting distance correction information for bringing the target extending and retracting distance closer to a proper extending and retracting distance is obtained based on the rack lateral width direction correction information and vertical direction correction information, and the target extending and retracting distance is derived for each of the plurality of storage units based on the derived extending and retracting distance correction information.

More specifically, the extending and retracting distance correction information is derived based on the amount of deviation between the set reference position and the position of the detected member in a direction corresponding to the displacement direction in an image captured by the frontal view camera, the amount of deviation between the set reference position and the position of the detected member in a direction corresponding to the displacement direction in an image captured by the angular view camera, and angle of intersection information between an optical axis of the frontal view camera and an optical axis of the angular view camera. The target extending and retracting distance can then be derived for each of the plurality of the storage units based on the derived extending and retracting distance correction information.

That is, in deriving the target extending and retracting distance, the extending and retracting distance correction information is derived by simple calculations using trigonometry based on the amount of deviation between the set reference position and the position of the detected member in a direction corresponding to the displacement direction in an image captured by the frontal view camera, the amount of deviation between the set reference position and the position of the detected member in a direction corresponding to the displacement direction in an image captured by the angular view camera, and angle of intersection information between an optical axis of the frontal view camera and an optical axis of the angular view camera to derive the target extending and retracting distance.

Therefore, the vertical direction correction information, rack lateral width direction correction information, and the extending and retracting distance correction information can be derived by simple calculations based on the image information captured by the frontal view camera and the image information captured by the angular view camera. Accordingly, the present invention provides for a learning method and device for an article storage facility in which the target stop position and the target extending and retracting distance may be corrected using simple calculations performed by the learning device.

DESCRIPTION OF THE PREFERRED EMBODIMENTS

The preferred embodiment of the learning device for an article storage facility in accordance with the present invention is described with reference to the attached drawings.

Figure 1:
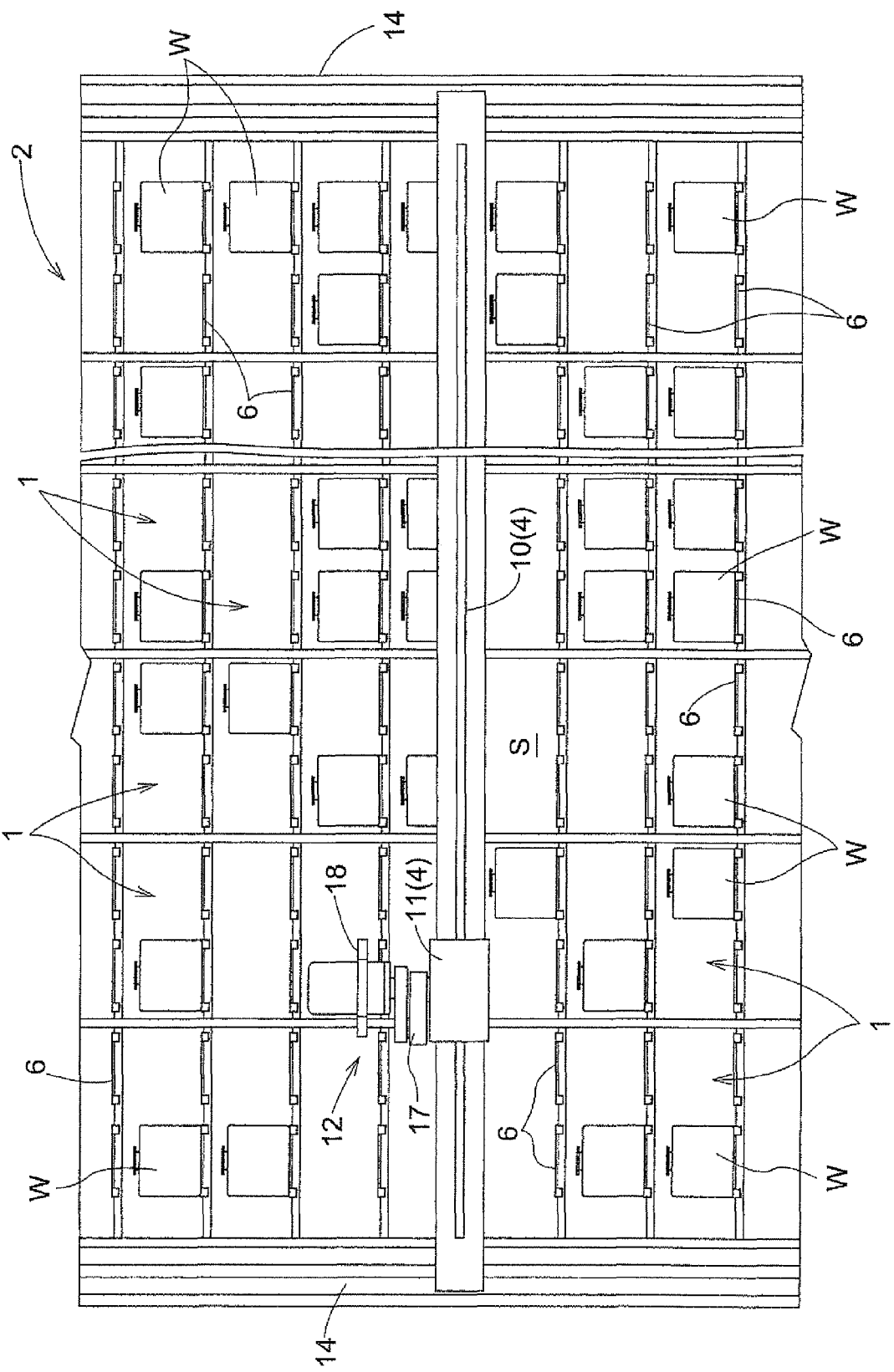
FIG. 1 is a side view of an article storage facility.

As shown in FIG. 1, the article storage facility includes article storage racks 2 with article storage units 1 arranged in the rack lateral width direction and the vertical direction, and the article transfer device 12 (article transfer means), etc. The article transfer device 12 can be moved by the transporting operation means 4 to each of the target stop positions which define positions, each corresponding to each of the plurality of storage units 1, in a rack lateral width direction, the vertical direction, and a rack fore-and-aft direction, respectively. And, the article transfer device 12 transfers an article W between the storage unit 1 and itself (the article transfer device 12) by moving an article support 18 in the rack fore-and-aft direction by a target extending and retracting distance with the article transfer device 12 stopped at a target stop position. The articles W are, for example, containers each of which stores a plurality of semiconductor substrates.

Figure 2:
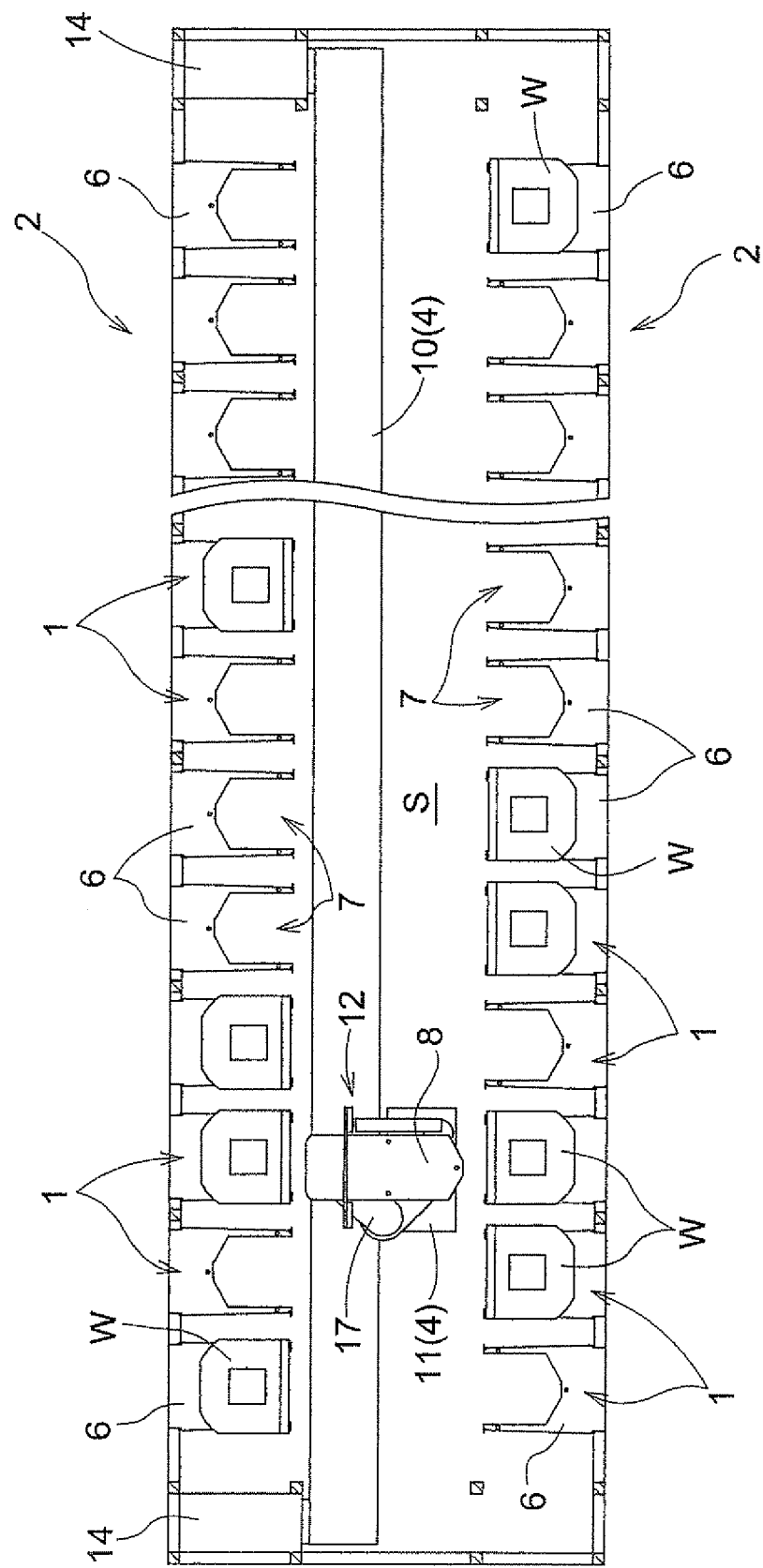
FIG. 2 is a plan view of the article storage facility.

As shown in FIG. 2, a pair of the article storage racks 2 are provided such as to face each other, and a travel space S for the transporting operation means 4 is defined between and to the front of the pair of article storage racks 2. Each of the storage unit 1 is configured to store an article W with the article W placed on and supported by an article supporting platform 6.

Figure 3:
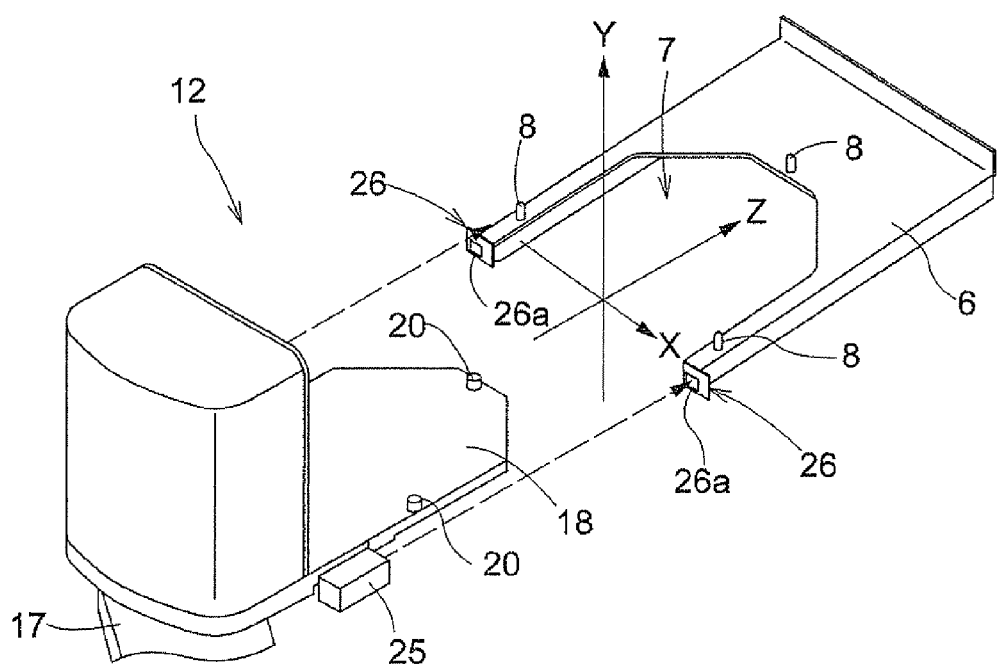
FIG. 3 is a drawing showing one photoelectric sensor detecting a reflecting plate.

The article supporting platform 6 is a rectangular member which opens to the travel space S and has a cut-out portion 7 formed in the shape of a U as shown in FIG. 3, for example. Three positioning pins 8, which fit into recessed portions formed in the bottom of the articles W, are provided in the periphery of the cut-out portion 7, and the articles W are configured to be supported with the positioning pins 8 fit into the recessed portions of the articles W to be positioned and held in place in the horizontal direction.

The transporting operation means 4 is described next.
As shown in FIGS. 1 and 2, the transporting operation means 4 has a vertically movable frame 10 (or a vertically movable lift) that extends longer than the article storage rack 2 in the rack lateral width direction and that is movable in the vertical direction in the travel space S, and a traveling platform 11 (horizontal travel carriage) that is configured to travel along the rack lateral width direction while guidingly supported by the vertically movable frame 10, and that supports the article transfer device 12. The transporting operation means 4 is configured to move the article transfer means 12 along the vertical direction by vertically moving the vertically movable frame 10, and along the rack lateral width direction by moving the traveling platform 11 along the rack lateral width direction.

To describe the transporting operation means 4 in more detail, while not shown, each of the pair of guiding support columns 14 has a driving toothed pulley for actuating at a lower end portion of the guiding support column 14, a driven toothed pulley at an upper end of the guiding support column 14, a toothed belt whose both ends are connected to the vertically movable frame 10, and whose intermediate portion is wound around the driving toothed pulley and the driven toothed pulley. The transporting operation means 4 is configured to vertically move the vertically movable frame 10 by rotating the driving toothed pulley backward and forward by an electric motor 15.

And, although illustration is similarly omitted, and similar to the pair of guiding support columns 14, the article transfer device 12 has a driving toothed pulley provided at an end portion of the vertically movable frame 10 in the rack lateral width direction, a driven toothed pulley provided at the other end portion of the vertically movable frame 10 in the rack lateral width direction, a toothed belt whose both ends are connected to the traveling platform 11, and whose intermediate portion is wound around the driving toothed pulley and the driven toothed pulley. The transporting operation means 4 is configured to vertically move the traveling platform 11 by rotating the driving toothed pulley backward and forward by an electric motor 16 for actuating the traveling platform.

As partially shown in FIG. 2, the article transfer device 12 is provided with a linkage 17 connected to the traveling platform 11 so as to extend and retract relative to the traveling platform 11, and the article support 18 operatively connected to the distal end portion of the linkage 17 so as to rotate about a vertically extending axis as the linkage 17 extends and retracts. The article support 18 is configured to extend and retract along the rack fore-and-aft direction while maintaining the attitude of the article support 18 by extending and retracting the linkage 17 by the electric motor 19 for extension and retraction. More specifically, the linkage 17 has a first arm that can be pivoted relative to the traveling platform 11 about a first pivot shaft extending in the vertical direction, and a second arm provided in the distal end portion of the first arm and pivotable about a vertically extending second pivot shaft. The article support 18 can be pivoted about a vertically extending third pivot shaft provided in the distal end portion of the second arm. In place of such a structure, the article transfer device 12 may have a first pair of arms configured to slide relative to the traveling platform 11 toward the article storage rack 2, and a second pair of arms configured to slide relative to the first pair of arms further toward the article storage rack 2, and to support the article support. In this case, the first arms and the second arms may be actuated by means of a drive unit using a known chain etc.

Three positioning pins 20, which fit into recessed portions formed in the bottom of articles W, are provided in the article support 18 of the article transfer device 12. And thus the article transfer device 12 is configured to support the article W with the article support 18 with the positioning pins 8 fit into the recessed portions of the article W to hold the article in place in the horizontal direction.

Incidentally, the article transfer device 12 is configured to rotate the article support 18 relative to the traveling platform 11 by 180 degrees about the vertical axis by means of an electric motor (not shown) so that the article support 18 may switch between an orientation in which it faces one article storage rack 2 and an orientation in which it faces the other article storage rack 2 and so that the article transfer device 12 can transfer articles to and from each storage unit 1 of either of the pair of the article storage racks 2.

Figure 10:
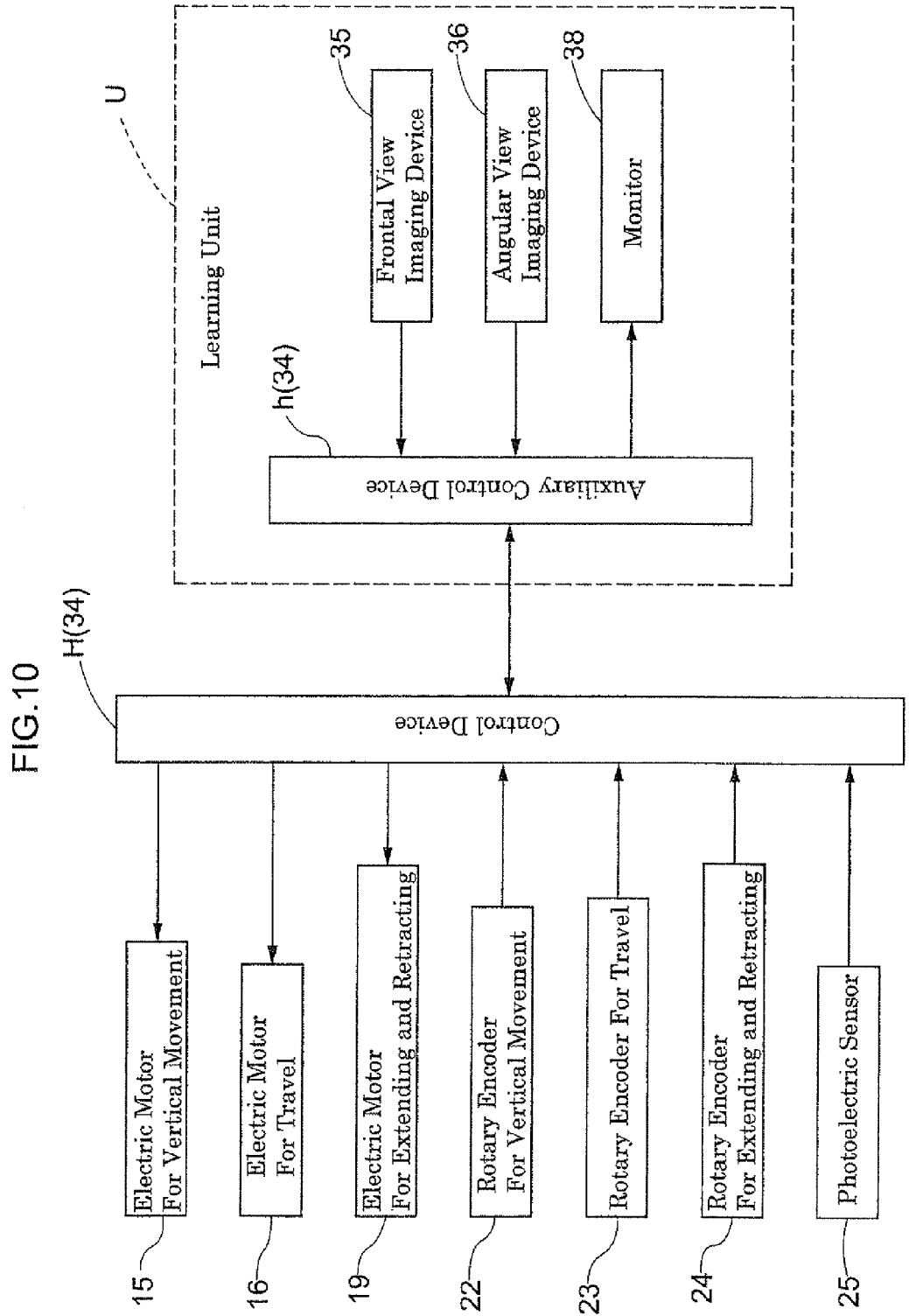
FIG. 10 is a control block diagram.

And as shown in FIG. 10, a control device H is provided which controls the operation of the transporting operation means 4 to move the article transfer means 12 to any of the target stop positions each of which corresponds to one of the plurality of storage units 1, and which also controls the operation of the article transfer means 12 to move the article support 18 by a target extending and retracting distance in order to transfer articles W to and from the storage units 1, each of which corresponds to the associated stopped target stop position. The control devices and the auxiliary control devices described in this specification include a CPU, memory, a communication unit, etc., and store algorithms for performing the functions described in the specification.

A rotary encoder 22 for vertical movement as a vertical position detection means for detecting the position of the article transfer device 12 in the vertical direction is operatively connected to a pivot shaft of the electric motor 15 for vertical movement so that electrical signals in the form of pulses are output as the pivot shaft of the electric motor 15 rotates.

And the pulses outputted from the rotary encoder 22 for vertical movement are inputted into the control device H as vertical position detection information. The control device H, with a lower end position in the vertical movement range of the vertically movable frame 10, or a position near it, defined as a vertical movement reference position, is configured to calculate the number of pulses from the vertical movement reference position to determine the vertical position of the vertically movable frame 10 and thus the position of the article transfer device 12 in the vertical direction.

In addition, a rotary encoder 23 for travel serving as a rack lateral position detection means for detecting the position of the article transfer device 12 in the rack lateral width direction is operatively connected to a pivot shaft of the electric motor 16 for travel so that electrical signals of the form of pulses are output as the pivot shaft of the electric motor 16 rotates.

And the pulses outputted from the rotary encoder 23 for travel are inputted into the control device H as rack lateral width position detection information. The control device H, with one end position in the travel movement range of the traveling platform 11, or a position near it, defined as a travel movement reference position, is configured to calculate the number of pulses from the travel movement reference position to determine the horizontal travel position of the traveling platform 11 and thus the position of the article transfer device 12 in the rack lateral width direction.

In addition, a rotary encoder 24 for extending and retracting movement serving as an extending and retracting distance detection means for detecting the extending and retracting distance of the article support 18 of the article transfer device 12 is operatively connected to a pivot shaft of the electric motor 19 for extending and retracting movement so that the electrical signals in the form of pulses are output as the pivot shaft of the electric motor 19 rotates.

And the pulses outputted from the rotary encoder 24 for extending and retracting movement are inputted into the control device H as extending and retracting distance detection information. The control device H, with the position at which the article support 18 is retracted most (i.e. retracted to the maximum extent), or a position near it defined, as an extending and retracting movement reference position, is configured to calculate the number of pulses from the extending and retracting movement reference position to determine the extending and retracting distance of the article support 18.

These encoders do not need to be attached to the pivot shaft of the corresponding motor, and they may simply be arranged at positions where they can detect the detected quantities. Gears etc. may be used as needed. Any of these detection means is not restricted to a rotary encoder and may also use a sensor which detects a distance or position using light or sound. Such a sensor may include a light source or a sound source, a reflective member that reflects the light or sound output from the source, and a receiver which receives the reflected light or sound to detect a distance or position by receiving the light or sound from the light source or the sound source with the receiver.

The control means H stores data for each of the target stop positions which define positions, each corresponding to each of the plurality of storage units 1, in the rack lateral width direction, vertical direction, and rack fore-and-aft direction. This target stop position, corresponding to each storage unit 1, is defined by a target vertical stop position information which represents the distance from the vertical movement reference position for defining the position of the article transfer device 12 in the vertical direction, and also by target rack lateral width stop position information which represents the distance from the travel movement reference position for defining the position of the article transfer device 12 in the rack lateral width direction. In addition, since the article transfer device 12 is not configured to move in the rack fore-and-aft direction, for a position represented by the target vertical stop position and the target rack lateral width stop position, the position in the rack fore-and-aft direction will also be well defined.

And two different positions are defined as the target stop position, namely: a target stop position for retrieving (i.e. receiving or scooping) an article W supported by the article supporting platform 6 of the storage unit 1 with the article transfer device 12, and a target stop position for setting down (i.e. delivering or transferring) an article W supported by the article transfer device 12 onto the article supporting platform 6 of the storage unit 1. The target stop position for retrieving is set to be at a lower position than the target stop position for delivering, and the target stop position for retrieving and the target stop position for delivering are set to be at the same position in the rack lateral width direction.

And, the control device H is configured to perform a retrieval operation in which an article W is retrieved from a storage unit 1, and a storage operation in which an article W is delivered to and stored in the storage unit 1.

In a retrieval operation, the control device H is configured: to control the operation of the vertically movable frame 10 and the traveling platform 11 in order to vertically move the vertically movable frame 10 and to move the traveling platform 11 based on the vertical position detected information and travel position detected information so that the article transfer device 12 is located in the target stop position (in this case, the target stop position for retrieving) corresponding to the target storage unit 1; then to cause the article support 18 to be projected by the target extending and retracting distance for the corresponding target storage unit 1 and to cause the vertically movable frame 10 to be raised so that the article transfer device 12 is located in the target stop position for delivering; and, after an article W is scooped or retrieved by the article transfer device 12, to control the operation of the vertically movable frame 10 and the article transfer device 12 so that the article support 18 is retracted by the target extending and retracting distance corresponding to the target storage unit 1.

In a storage operation in which an article W is stored in a storage unit 1, the control device H is configured: to control the operation of the vertically movable frame 10 and the traveling platform 11 in order to vertically move the vertically movable frame 10 and to move the traveling platform 11 based on the vertical position detected information and travel position detected information so that the article transfer device 12 is located in the target stop position (in this case, the target stop position for delivering) corresponding to the target storage unit 1; then to cause the article support 18 to be projected by the target extending and retracting distance for the corresponding target storage unit 1 and to cause the vertically movable frame 10 to be lowered so that the article transfer device 12 is located in the target stop position for retrieving; and, after the article W is set down by the article transfer device 12, to control the operation of the vertically movable frame 10 and the article transfer device 12 so that the article support 18 is retracted by the target extending and retracting distance corresponding to the target storage unit 1.

As shown in FIG. 3, a photoelectric sensor 25 for checking the stop position is provided to the article transfer device 12 to be movable integrally therewith, for checking whether the position of the article transfer device 12 is at an article transfer position, relative to a storage unit 1 with respect to the rack lateral width direction and the vertical direction, at which it is possible for the article W to be transferred to the corresponding storage unit 1.

In more detail, reflecting plates 26 (detected members) are provided in the end portions of the pair of projecting portions, projecting toward the travel space S, of the article supporting platform 6 of the storage unit 1 with each of the rectangular reflective surface 26a (detected surface) oriented parallel to the front of the rack. A right and left pair of photoelectric sensors 25 are supported by the article transfer device 12 such that the right and left sensors 25 are positioned in association with the pair of reflecting plates 26 and such that they are at different heights. Each of the pair of photoelectric sensors 25 is positioned such that light emitted by the light source is reflected by the reflecting plate 26 and is received by the receiving portion when the article transfer device 12 is in the article transfer position.

Incidentally, one of the photoelectric sensors 25 is located such as to receive light as described above when the article transfer device 12 is located in the article transfer position for retrieving, and the other of the photoelectric sensors 25 is located such as to receive light as described above when the article transfer device 12 is located in the article transfer position for delivering which is higher than the article transfer position for retrieving.

As shown in FIG. 10, the detected information outputted from the photoelectric sensor 25 is inputted into the control device H, and with the article transfer device 12 stopped at the target stop position, the control device H is configured to perform a stop determination operation to determine whether the article transfer device 12 is stopped in the suitable position for the storage unit 1 based on the detected information representing detection of existence of the reflecting plate 26 from the photoelectric sensor 25.

And as part of the stop determination operation, with the article transfer device 12 stopped at the target stop position for retrieving in a retrieval operation, the control device H is configured to proceed with performing the retrieval operation if it determines that the article transfer device 12 is positioned at an appropriate position for the storage unit 1 based on the detected information from one of the photoelectric sensors 25, and to suspend the retrieval operation if it determines that the article transfer device 12 is not positioned at the appropriate position for the storage unit 1.

Similarly, as part of the stop determination operation, with the article transfer device 12 stopped at the target stop position for delivering in a storage operation, the control device H is configured to proceed with performing the storage operation if it determines that the article transfer device 12 is positioned at an appropriate position for the storage unit 1 based on the detected information from one of the photoelectric sensors 25, and to suspend the storage operation if it determines that the article transfer device 12 is not positioned at an appropriate position for the storage unit 1.

As shown in FIG. 10 and as described above, the control device H is configured to control the operations of the vertically movable frame 10, the traveling platform 11, and the article transfer device 12 to perform work operations and to perform retrieval operations and storage operations. And the control device H is configured to perform a learning operation in collaboration with an auxiliary control device h of the learning unit U when a learning unit U is attached to the article transfer device 12, A learning device comprises the transporting operation means 4, the article transfer device 12, the reflecting plate 26, the control device H, and the learning unit U, etc.

A learning operation is described next. However, the learning unit U is described first since the learning unit U is attached to the article transfer device 12 when performing this learning operation.

Figure 4:
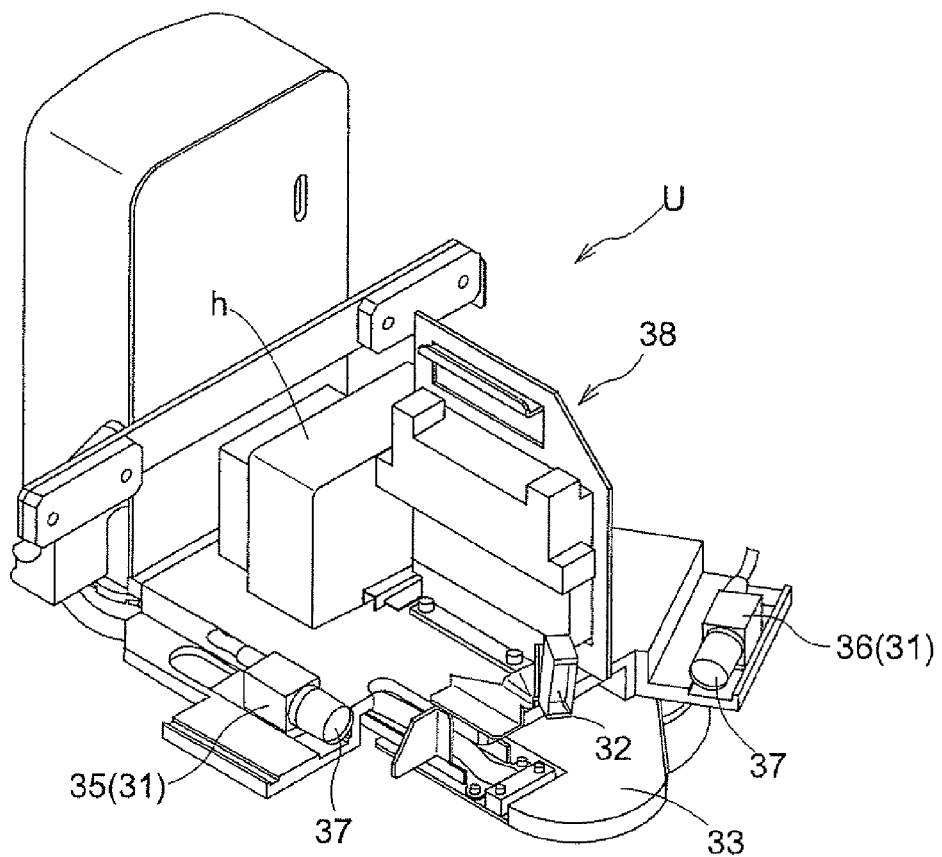
FIG. 4 is a perspective view of an attached learning unit.
Figure 5:
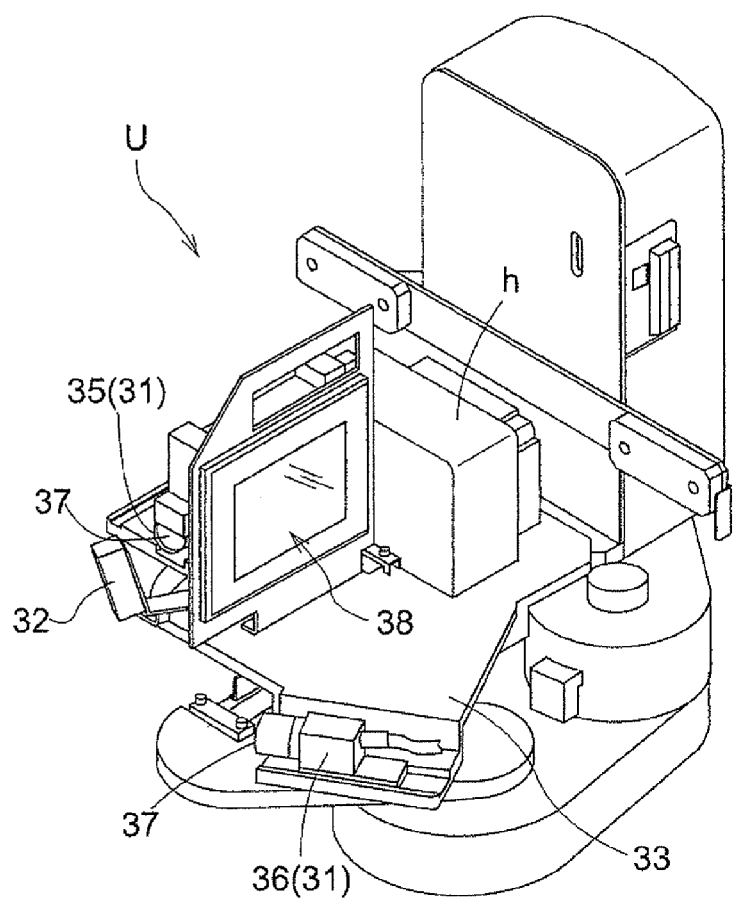
FIG. 5 is a perspective view of an attached learning unit.
Figure 6:
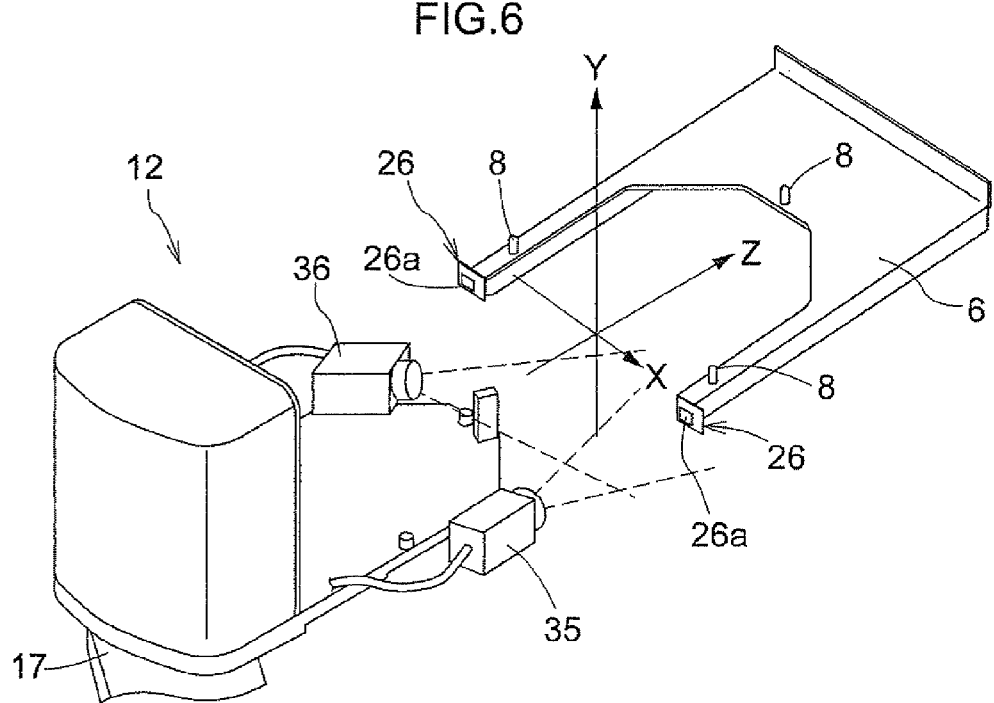
FIG. 6 is a drawing showing an image of the reflecting plate being captured with the imaging device.

As shown in FIGS. 4-6, the learning unit U includes imaging means 31 for capturing an image of the reflecting plate 26, an infrared light emitter 32 which emits infrared light toward the reflecting plate 26, an auxiliary control device h which performs calculation to obtain the target stop position and the target extending and retracting distance for each of a plurality of storage units 1 based on the image information captured by the imaging means 31, a monitor 38 for displaying the image captured by the imaging means 31, all of which are integrally assembled onto the unit platform 33 to form a unit.

And, the learning unit U is removably attached to the article transfer means 12, and by virtue of the fact that the learning unit U is attached removably, each of the imaging means 31, the infrared light emitter 32, and the auxiliary control device h is removably attached or mounted to the article transfer means 12. The unit platform 33 may be positioned in place by engaging the positioning pins 20 provided in the article support 18.

Thus, the learning unit U is mounted to the article transfer device 12 by virtue of the fact that it is supported by the article support 18. And, the reflecting plate 26 whose image is captured by the imaging means 31 also serves as the reflecting plate 26 detected by the photoelectric sensor 25 to check the stop position of the article transfer means 12.

The imaging means 31 includes a frontal view imaging device (or camera) 35 which captures an image of the reflecting plate 26 provided in association with each storage unit 1 from the rack fore-and-aft direction, and an angular view imaging device (or camera) 36 which is displaced relative to the frontal view imaging device 35 in the rack lateral width direction, and which captures an image of the reflecting plate 26 from a direction that is at an angle (or inclined) with respect to the rack fore-and-aft direction.

And the frontal view imaging device 35 and the angular view imaging device 36 may be moved integrally with the article transfer device 12 by virtue of being integrally mounted to the unit platform 33.

And the infrared emitter may similarly be moved integrally with the article transfer device 12 by virtue of being integrally mounted to the unit platform 33.

Figure 7:
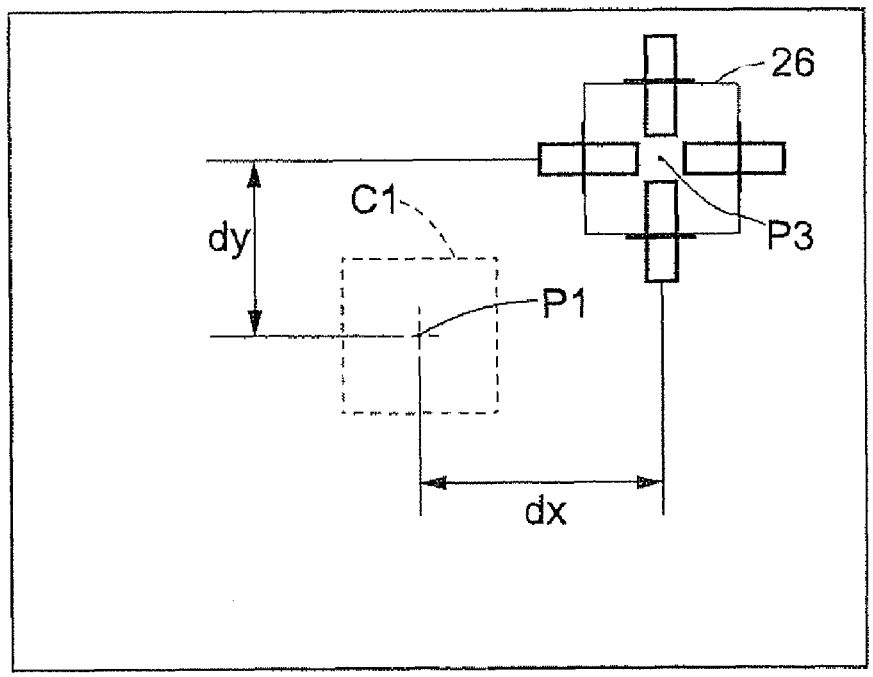
FIG. 7 shows a frontal view image.

The frontal view imaging device 35 is positioned with respect to the article transfer device 12 such that, when the frontal view imaging device 35 captures an image of the reflecting plate 26 while the article transfer means 12 is assumed to be at a standard proper position relative to the storage unit 1 with respect to each of the rack lateral width direction, the vertical direction, and the rack fore-and-aft direction, which is an appropriate position for a transfer of an article W, the image of the reflecting plate 26 is located at a set reference position C1 (see FIG. 7) within the image taken (hereafter referred to sometimes as the frontal view image).

Figure 8:
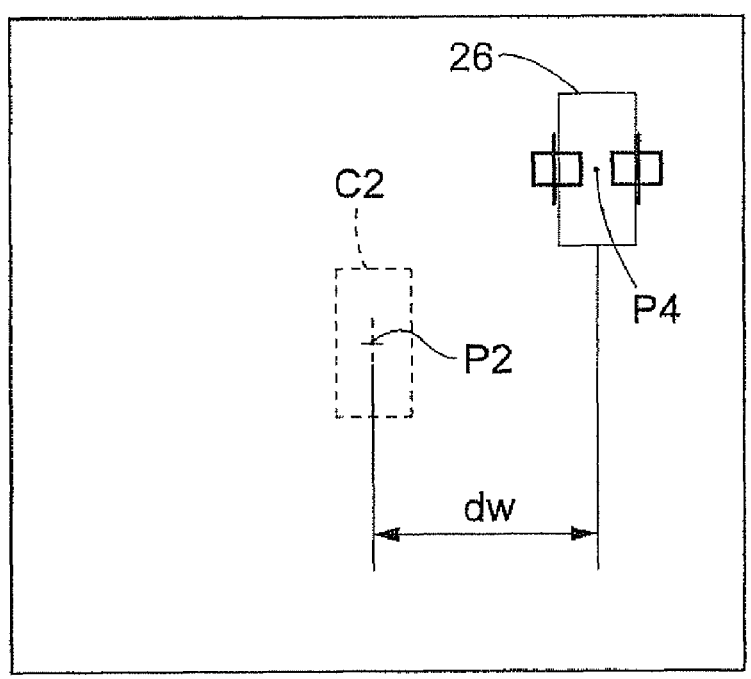
FIG. 8 shows an angular image.

In addition, the angular view imaging device 36 is positioned with respect to the article transfer device 12 such that when the angular view imaging device 36 captures an image of the reflecting plate 26 while the article transfer means 12 is assumed to be at the standard proper position relative to the storage unit 1, the image of the reflecting plate 26 is located at a set reference position C2 (see FIG. 8) within an image taken (hereafter referred to sometimes as the angular view image).

The angular view imaging device 36 is located closer to a storage unit 1 in the rack fore-and-aft direction than the frontal view imaging device 35.

To elaborate further on the positional relationship between the frontal view imaging device 35 and the angular view imaging device 36, the frontal view imaging device 35 and the angular view imaging device 36 are provided to capture an image of the same one of the pair of the reflecting plates 26. And the frontal view imaging device 35 is positioned directly in front of the one reflecting plate 26. And the angular view imaging device 36 is displaced relative to the frontal view imaging device 35 in the rack lateral width direction to the side in which the other of the reflecting plates 26 is located, is located at the same vertical level as frontal view imaging device 35, and is located closer to a storage unit 1 in the rack fore-and-aft direction than the frontal view imaging device 35.

And by arranging the frontal view imaging device 35 and the angular view imaging device 36 as described above, they are located such that at least inward side edge portions of the frontal view imaging device 35 and, the angular view imaging device 36 in the rack lateral width direction are located within an width of a storage unit 1 in the rack lateral width direction when the article transfer means 12 is assumed to be located at the standard proper position with respect to a storage unit 1.

Figure 9:
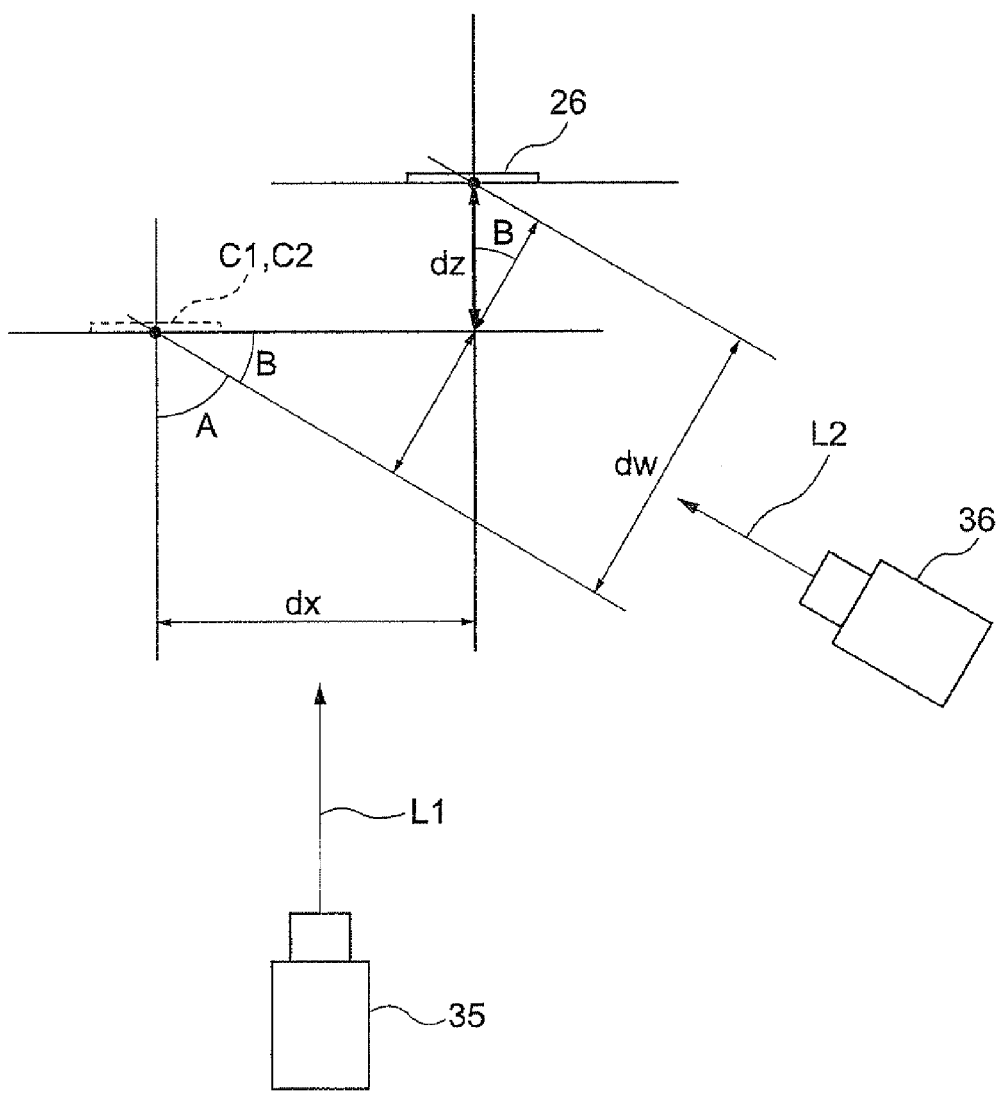
FIG. 9 is a virtual plan view based on the frontal view image and the angular image.

In addition, the frontal view imaging device 35 and the angular view imaging device 36 are positioned such that the distance to the reflecting plate 26 is the same or approximately the same for both imaging devices and such that, as shown in FIG. 9, the optical axis L1 (direction of view) of the frontal view imaging device 35 and the optical axis L2 (direction of view) of the angular view imaging device 36 are both parallel to the horizontal, and the angle A of intersection between the axes is 60 degrees.

An infrared filter 37 which allows infrared light to pass through is provided to the frontal view imaging device 35 and to the angular view imaging device 36 so that the frontal view imaging device 35 and the angular view imaging device 36 are configured to capture an image of the reflecting plate 26, which is illuminated by the infrared light emitted by the infrared emitter 32, through the infrared filter 37 and thus to serve as infrared cameras. As an example of the imaging device, a known analog, or digital still camera or a video camera such as a CMOS camera, or a CCD camera, etc. may be used.

In a learning operation, the learning control means 34, which includes the control device H and the auxiliary control device h, is configured: to cause the article transfer means 12 to be moved to target stop positions in turn for a plurality of storage units 1 of the article storage rack 2; to perform an imaging operation which controls the operation of the transporting operation means 4, the frontal view imaging device 35, and the angular view imaging device 36 to cause the frontal view imaging device 35 and the angular view imaging device 36 to take one or more images while the article transfer means 12 is located at a target stop position; based on an image information of the frontal view imaging device 35, and an image information of the angular view imaging device 36, to derive rack lateral width direction correction information and the vertical direction correction information for bringing the target stop position closer to the standard proper position in the rack lateral width direction and the vertical direction, and extending and retracting distance correction information for bringing the target extending and retracting distance closer to a proper extending and retracting distance; and to perform calculation to obtain the target stop position and target extending and retracting distance for each of the plurality of storage units 1 based on the derived rack lateral width direction correction information, the vertical direction correction information, and the extending and retracting distance correction information.

The learning control means 34 is configured to determine the position of the reflecting plate 26 in the image in the calculation as follows.

The learning control means 34 determines the vertical position of the reflecting plate 26 based on the position of both ends in the vertical direction in the frontal view image corresponding to the vertical direction of the reflecting plate 26. That is, in the calculating operation, the learning control means 34 first determines the upper end position and lower end position of the reflecting plate 26 in the frontal view image, and determines the central position P3 between the upper end position and the lower end position as a position of the reflecting plate 26 in the vertical direction in the frontal view image.

In addition, the learning control means 34 determines the rack lateral width position of the reflecting plate 26 based on the position of both ends in the lateral direction in the frontal view image corresponding to the rack lateral width direction of the reflecting plate 26. Similar to the process described above, the learning control means 34 first determines the right end position and left end position of the reflecting plate 26 in the frontal view image, and determines the central position P3 between the right end position and the left end position as a position of the reflecting plate 26 in the lateral direction in the frontal view image.

In addition, the learning control means 34 determines the lateral position of the reflecting plate 26 based on the position of both ends in the lateral direction in the angular view image. Similar to the process described above, the learning control means 34 first determines the right end position and left end position of the reflecting plate 26 in the angular view image, and determines the central position P4 between the right end position and the left end position as a position of the reflecting plate 26 in the lateral direction in the angular view image.

The learning control means 34 is configured to obtain rack lateral width direction correction information and the vertical direction correction information in the calculation as follows.

The learning control means 34 derives the vertical direction correction information in the calculating operation based on the amount of deviation dy between the set reference position C1 and the position of the reflecting plate 26 in the vertical direction in the frontal view image. Specifically, the distance in the vertical direction between the central position P1 of the set reference position C1 and the central position P3 of the reflecting plate 26 in the frontal view image is defined to be the amount of deviation dy in the vertical direction between the set reference position C1 and the position of the reflecting plate 26, and the vertical direction correction information corresponding to the actual amount of deviation is obtained by multiplying this amount of deviation dy by a conversion coefficient.

In addition, the learning control means 34 derives the rack lateral width direction correction information in the calculating operation based on the amount of deviation dx between the set reference position C1 and the position of the reflecting plate 26 in the lateral direction in the frontal view image. Specifically, similar to the process of obtaining the vertical direction correction information, the distance in the lateral direction between the central position P1 of the set reference position C1 and the central position P3 of the reflecting plate 26 in the frontal view image is defined to be the amount of deviation dx in the lateral direction between the set reference position C1 and the position of the reflecting plate 26, and the rack lateral width direction correction information corresponding to the actual amount of deviation is obtained by multiplying this amount of deviation dx by a conversion coefficient.

The learning control means 34 is configured to obtain the extending and retracting distance correction information in the calculation as follows.

In the calculation, the learning control means 34 obtains the extending and retracting distance correction information based on the amount of deviation dx in the lateral direction between the set reference position C1 and the position of the reflecting plate 26 in the frontal view image, the amount of deviation dw in the lateral direction between the set reference position 02 and the position of the reflecting plate 26 in the angular image captured by the angular view imaging device 36, and the angle of intersection information which represents the angle A of intersection between the optical axis of the frontal view imaging device 35 and the optical axis of the angular view imaging device 36. The angle of intersection A is pre-set to be 60 degrees in the learning control means 34. Specifically, the distance in the lateral direction between the central position P2 of the set reference position C2 and the central position P4 of the reflecting plate 26 in the angular view image is defined to be the amount of deviation dw in the lateral direction between the set reference position C2 and the position of the reflecting plate 26, and the inclination angle B of the optical axis of the angular view imaging device 36 with respect to a plane along the front surface of the rack is derived based on the angle of intersection A.

And, based on the amount of deviation dx in the lateral direction in the frontal view image, the amount of deviation dw in the lateral direction in the angular image, and the inclination angle B of the optical axis of the angular view imaging device 36 derived using the angle of intersection information, the amount of deviation dz in the depth direction is calculated by the following formula, and the extending and retracting distance correction information corresponding to actual amount of deviation is derived by multiplying the amount of deviation dz in the depth direction with a conversion coefficient.

$$dz=(dw-dx(\sin B))/\cos B$$

The vertical direction correction information is derived with an understanding that the deviation dy has a negative value when the image of the reflecting plate 26 with respect to the set reference position C1 in the frontal view image deviates to the side corresponding to the side in which the vertical movement reference position is located in the vertical direction, and has a positive value if the image deviates in the opposite direction.

In addition, the rack lateral width direction correction information is derived with an understanding that the deviation dx has a negative value when the position of the reflecting plate 26 with respect to the set reference position C1 in the frontal view image deviates to the side corresponding to the side in which the travel movement reference position is located in the lateral direction, and has a positive value if the image of the reflecting plate 26 deviates in the opposite direction.

Also, the extending and retracting distance correction information is derived with an understanding that the deviation dw has a negative value when the deviation direction the position of the reflecting plate 26 with respect to the set reference position C2 in the angular view image is to the side in which the extending and retracting movement reference position is located in the lateral direction, and has a positive value if the direction of deviation is opposite therefrom.

And the target vertical stop position information after the learning operation is derived by adding the amount of deviation represented by the vertical direction correction information to the distance represented by the target vertical stop position information. The target rack lateral width stop position information after the learning operation is derived by adding the amount of deviation represented by the rack lateral width direction correction information to the distance represented by the target rack lateral width stop position information shows. The target extending and retracting distance after the learning operation is derived by adding the amount of deviation represented by the extending and retracting distance correction information to the distance represented by the target extending and retracting distance.

Since the central position P3 of the reflecting plate 26 is shifted away from the optical axis L1 of the frontal view imaging device 35 in the rack lateral width direction when the target stop position is deviated from the standard proper position in the rack lateral width direction, even if the amount of deviation of the target stop position in the rack lateral width direction from the standard proper position is constant, the amount of deviation dx of the reflecting plate 26 in the lateral direction in the frontal view image changes depending on the difference between the target extending and retracting distance and the proper extending and retracting distance at the standard proper position, which causes an error.

And, when the target stop position is deviated from the standard proper position in the rack lateral width direction as described above and the proper extending and retracting distance differs from the target extending and retracting distance at the standard proper position, then the amount of deviation dw of the reflecting plate 26 in the lateral direction in the angular image changes depending on the amount of deviation in the imaging direction of the angular view imaging device 36 of the reflecting plate 26 from the standard plane which intersects perpendicularly with the optical axis L2 of the angular view imaging device 36 and on which the set reference position C1 and C2 are located, which causes an error.

However, even if the error occurs as mentioned above, the error would not be large enough to cause any problems since, for example, when the article transfer device 12 is at the standard proper position, if the distance from the frontal view imaging device 35 to the reflecting plate 26 is 250 mm, and the target stop position is deviated from the standard proper position in the rack lateral width direction by 15 mm, and if the target extending and retracting distance is shorter by 15 mm than the proper extending and retracting distance at the standard proper position, each error is about 1 mm, thus the article transfer device 12 would be located within the tolerance level for the position at which an article transfer is possible.

The monitor 38 is configured to selectively display the frontal view image or the angular image. The image displayed on this monitor 38 is processed suitably, such as to add a reference position mark representing the set reference positions C1 and C2 and the end marks representing the end portions of the reflecting plate 26.

Figure 11:
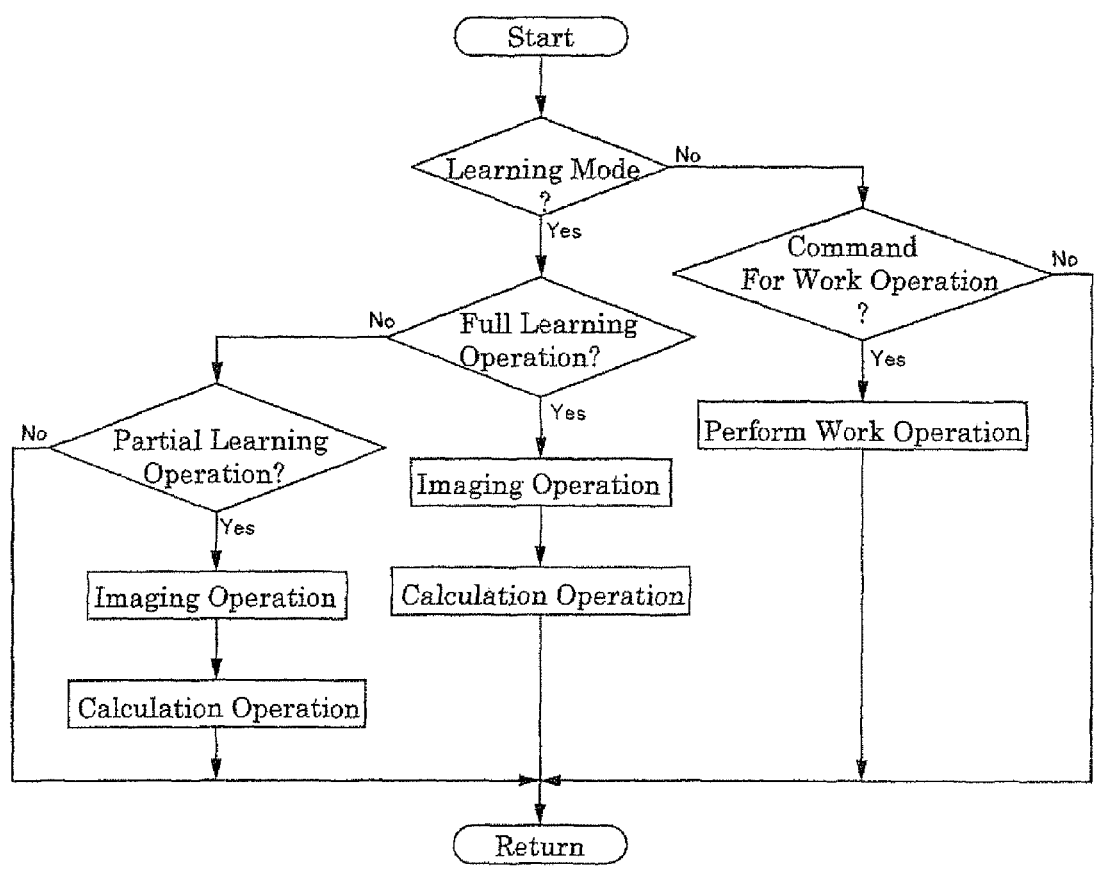
FIG. 11 shows the flow chart.

The operation of the learning control means 34 is described next with reference to the flow chart in FIG. 11.

The control device H operates in work mode when the learning unit U is not attached to the article transfer device 12. In this work mode, work operation is performed by the control device H according to the operations directive information from a superordinate control device. And, the control device H operates in the learning mode when the learning unit U is attached to the article transfer device 12. In this learning mode, learning operation is performed by the control device H in cooperation with the auxiliary control device h, or more particularly, by the learning control means 34 based on the learning command information from the learning command means (not shown).

And as learning operation, a full learning operation which determines the target stop positions and target extending and retracting distances for each of all the storage units 1 in the article storage rack 2, or a partial learning operation which determines the target stop position(s) and target extending and retracting distance(s) for one or more storage units 1 in the article storage rack 2 is performed.

The imaging operation and the calculating operation are performed in the full learning operation and the partial learning operation.

The imaging operation in the full learning operation involves first causing the article transfer device 12 to be moved to the target stop position for the storage unit 1 which is located in the first (or bottom) row of the article storage rack 2 and in one end side in the rack lateral width direction, and causing the frontal view imaging device 35 and the angular view imaging device 36 to take one or more images while located in the target stop position. Next, the article transfer device 12 is moved toward the other end in the rack lateral width direction to position it in the next target stop position for the adjoining storage unit located closer to the other end in the rack lateral width direction, and the frontal view imaging device 35 and the angular view imaging device 36 are caused to take one or more images while located in the target stop position.

Figure 12:
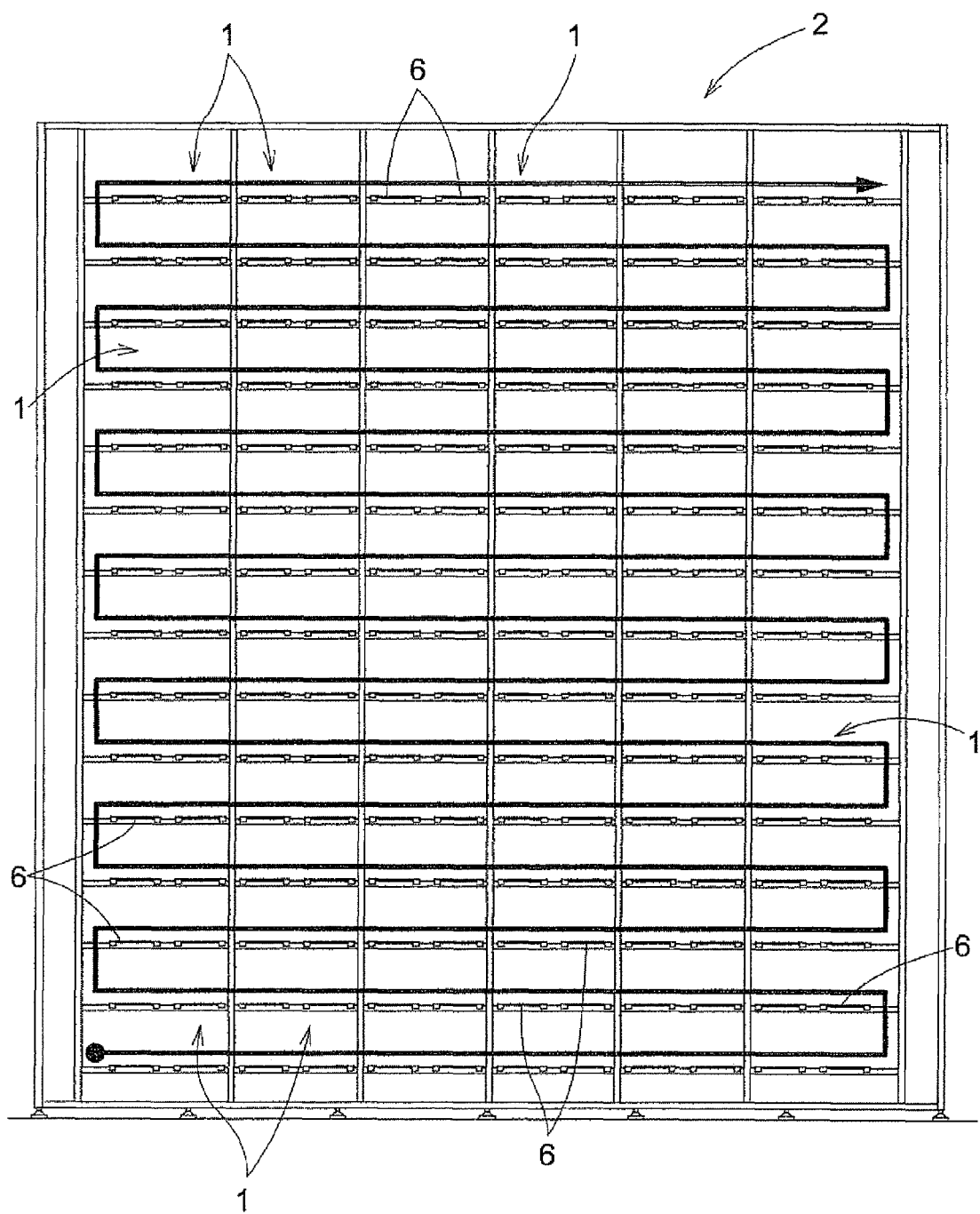
FIG. 12 shows the travel path of the article transfer device in the imaging operation.

This process is repeated to move the article transfer device 12 to the target stop position for each of a plurality of storage units 1, each in turn from one end side of the first (bottom) row of the article storage rack 2 to the other end side in the rack lateral width direction. For the second row of the article storage rack 2, the article transfer device 12 is moved to the target stop position for each of a plurality of storage units 1, from the other end side to the one end side in the rack lateral width direction. (See FIG. 12.) In this manner, the article transfer device 12 is moved in a zigzagging manner so that the article transfer device 12 passes each target stop position once to move the article transfer device 12 to the target stop position for each of all the storage units 1 in the article storage rack 2 one by one.

And a calculation in the full learning operation determines the target stop position and target extending and retracting distance in each of all the storage units 1 of the article storage rack 2 based on the image information captured by the frontal view imaging device 35 and the angular view imaging device 36 at the target stop position in all the storage units 1 of the article storage rack 2.

In the imaging operation in the partial learning operation, the article transfer device 12 is moved one by one to the target stop positions for one or more, and less than all of, the storage units 1 of the article storage rack 2, which are selected as the subject of the learning operation.

And a calculation in the partial learning operation determines the target stop position and target extending and retracting distance in each of some (and less than all) of the storage units 1 of the article storage rack 2 which are selected as the subject of the learning operation, based on the image information captured by the frontal view imaging device 35 and the angular view imaging device 36 at the target stop position for some the storage units 1 of the article storage rack 2 which are selected as the subject of the learning operation.

Alternative Embodiments (1) While the position of the angular view imaging device 36 is displaced with respect to the frontal view imaging device 35 in the rack lateral width direction in the embodiment described above, the angular view imaging device 36 may be displaced with respect to the frontal view imaging device 35 in the vertical direction.

(2) While the angular view imaging device 36 is located closer to the storage unit 1 in the rack fore-and-aft direction than the frontal view imaging device 35 in the embodiment described above, the angular view imaging device 36 may be at the same position in the rack fore-and-aft direction as the frontal view imaging device 35, or may be located further from the storage unit 1 in the rack fore-and-aft direction than the frontal view imaging device 35.

(3) In the embodiment described above, the position of the detected member 26 in the image captured by the frontal view imaging device 35 is determined based on the positions of both ends of the detected member 26 of the vertical direction in the image to determine the vertical position of the detected member 26, and, the position of the detected member 26 in the lateral direction is determined based on the position of both ends of the detected member 26 in the lateral direction in the image. However, for example, the determination of the vertical position of the detected member 26 may be based on the position of one vertical end of the detected member 26 in the image, and the position of the detected member 26 in the lateral direction may be determined based on the position of one lateral end of the detected member 26 in the image. Accordingly, the position of the detected member 26 may be determined based on the position(s) of a portion or portions other than both ends portions of the detected member 26.

Similarly, with respect to the determination of the position of the detected member 26 in the image captured by the angular view imaging device 36, the position of the detected member 26 may be determined based on the position of one lateral end of the detected member 26 in the image; the position of the detected member 26 may be determined based on a position or positions of other portions of the detected member 26.

(4) While the infrared light emitter is provided to the article transfer means to be integrally moved therewith, and the emitter emits the infrared light toward the detected member, and is provided with an infrared film or filter with which the frontal view imaging device and the angular view imaging device allows infrared light to path through in the embodiment described above, neither the infrared light emitter nor the infrared film or filter is required when the detected member can be detected accurately without the infrared emitter or the infrared film.

(5) While, in the embodiment described above, the transporting operation means 4 includes the vertically movable frame 10 which is vertically movable in the travel space S, and the traveling platform 11 which is guidingly supported by this vertically movable frame 10 for moving along the rack lateral width direction, and which supports the article transfer device 12 so that the article transfer means 12 can be moved in the vertical direction and in the rack lateral width direction, the transporting operation means 4 may include a traveling carriage that runs along the rack lateral width direction, and a vertically movable platform which is guidingly supported to be vertically movable by a support column arranged vertically on the traveling carriage, and which supports the article transfer device, so that the article transfer means 12 may be moved in the vertical direction and in the rack lateral width direction in this manner.

(6) While the detected member 26 is a rectangular reflecting plate in the embodiment described above, a circular or spherical reflecting plate may be used instead, so long as the learning control means 34 can determine the position of the detected member 26 in the image.

(7) While in the embodiment described above, the transporting operation means 4 is configured such that the article transfer device 12 may be moved only in the vertical direction and in the rack lateral width direction but not in the rack fore-and-aft direction so that the position in the rack fore-and-aft direction is defined given the position represented by the target vertical direction stop position and the target rack lateral width direction stop position, the transporting operation means 4 may be configured such that the article transfer device 12 may also be moved in the rack fore-and-aft direction and so that the position of the article transfer device 12 in the rack fore-and-aft direction may be defined by movement of the rack fore-and-aft direction of the article transfer device 12.

What is claimed is:

1. A learning method for an article storage facility having an article storage rack including a plurality of article storage units arranged in a rack lateral width direction and in a vertical direction, and an article transfer device configured to be moved, by a vertically movable lift and a horizontal travel carriage associated with the vertically movable lift, to each of target stop positions, each of which is a position defined, in association with one of the plurality of the storage units, in the rack lateral width direction, the vertical direction, and a rack fore-and-aft direction, wherein an article is transferred to and from a storage unit by moving an article support provided to the article transfer device in the rack fore-and-aft direction by a target extending and retracting distance while the article transfer device is stopped at a target stop position, the method comprising:

positioning a frontal view camera with respect to the article transfer device such as to capture an image of a detected member provided in association with each of the storage units from the rack fore-and-aft direction, and such that, when the frontal view camera captures an image of the detected member while the article transfer device is assumed to be at a standard proper position relative to a storage unit with respect to each of the rack lateral width direction, the vertical direction, and the rack fore-and-aft direction, which is an appropriate position for an article transfer, the image of the detected member is located at a set reference position within the image taken;

positioning an angular view camera with respect to the article transfer device such as to be displaced with respect to the frontal view camera in a displacement direction which is either the rack lateral width direction or the vertical direction to capture an image of the detected member from a direction which is at an angle with respect to the rack fore-and-aft direction, and such that, when the angular view camera captures an image of the detected member while the article transfer device is assumed to be at the standard proper position relative to the storage unit, the image of the detected member is located at a set reference position within the image taken;

performing an imaging operation wherein the article transfer device is caused to be moved to the target stop position for each of the plurality of the storage unit in turn, and operations of the frontal view camera, the angular view camera and of at least one of the vertically movable lift and the horizontal travel carriage are controlled to cause the frontal view camera and the angular view camera to capture an image while the article transfer device is at the target stop position;

deriving rack lateral width direction correction information and vertical direction correction information for bringing the target stop position closer to the standard proper position in the rack lateral width direction and the vertical direction, and extending and retracting distance correction information for bringing the target extending and retracting distance closer to a proper extending and retracting distance based on an image information from the frontal view camera and an image information from the angular view camera, and performing a calculation to obtain the target stop position and target extending and retracting distance for each of the plurality of storage units based on the derived rack lateral width direction correction information, the vertical direction correction information, and the extending and retracting distance correction information;

wherein the vertical direction correction information is derived in the calculating step based on an amount of deviation between the set reference position and the position of the detected member, in a direction corresponding to the vertical direction, in the frontal view image captured by the frontal view camera, and the rack lateral width direction correction information is derived in the calculating step based on an amount of deviation between the set reference position and the position of the detected member, in a lateral direction corresponding to the rack lateral width direction;

wherein the extending and retracting distance correction information is derived based on the amount of deviation between the set reference position and the position of the detected member in a direction corresponding to the displacement direction in an image captured by the frontal view camera, the amount of deviation between the set reference position and the position of the detected member in a direction corresponding to the displacement direction in an image captured by the angular view camera, and angle of intersection information between an optical axis of the frontal view camera and an optical axis of the angular view camera.

2. A learning method as defined in claim 1, wherein the steps of positioning the frontal view camera and of positioning the angular view camera includes positioning the cameras such that the angular view camera is located closer to a storage unit than the frontal view camera in the rack fore-and-aft direction.

3. A learning method as defined in claim 1, wherein the detected member has a rectangular detected surface that extends along a front plane of the storage rack,
a vertical position of the detected member is determined based on positions of vertical ends of the detected member on an image captured by the frontal view camera,
a lateral position of the detected member is determined based on positions of lateral ends of the detected member on the image captured by the frontal view camera,
a position of the detected member is determined based on positions of lateral ends of the detected member on an image captured by the angular view camera.

4. A learning method as defined in claim 1, wherein the steps of positioning the frontal view camera and of positioning the angular view camera includes removably attaching the frontal view camera and the angular view camera to the article transfer device as a unit.

5. A learning method as defined in claim 1 further comprising:
positioning an infrared emitter configured to move integrally with the article transfer device and to emit infrared light toward the detected member;
providing an infrared filter, for allowing infrared light to pass, to each of the frontal view camera and the angular view camera.

6. A learning method as defined in claim 1 further comprising:
using the detected member as a reflector for a sensor adapted to confirm a stop position of the article transfer device.

7. A learning method as defined in claim 1, wherein the step of the article transfer device being caused to be moved to the target stop position for each of the plurality of the storage unit in turn includes:
causing the vertically movable lift, that extends longer than the article storage rack in the rack lateral width direction, to be moved vertically; and
causing the horizontal travel carriage to be moved along the rack lateral width direction wherein the horizontal travel carriage is configured to be guided and supported by the vertically movable lift, and to support the article transfer device.

8. A learning method for an article storage facility having an article storage rack including a plurality of article storage units arranged in a rack lateral width direction and in a vertical direction, and an article transfer device configured to be moved, by a vertically movable lift and a horizontal travel carriage associated with the vertically movable lift, to each of target stop positions, each of which is a position defined, in association with one of the plurality of the storage units, in the rack lateral width direction, the vertical direction, and a rack fore-and-aft direction, wherein an article is transferred to and from a storage unit by moving an article support provided to the article transfer device in the rack fore-and-aft direction by a target extending and retracting distance while the article transfer device is stopped at a target stop position, the method comprising:

positioning a frontal view camera with respect to the article transfer device such as to capture an image of a detected member provided in association with each of the storage units from the rack fore-and-aft direction, and such that, when the frontal view camera captures an image of the detected member while the article transfer device is assumed to be at a standard proper position relative to a storage unit with respect to each of the rack lateral width direction, the vertical direction, and the rack fore-and-aft direction, which is an appropriate position for an article transfer, the image of the detected member is located at a set reference position within the image taken;

positioning an angular view camera with respect to the article transfer device such as to be displaced with respect to the frontal view camera in a displacement direction which is either the rack lateral width direction or the vertical direction to capture an image of the detected member from a direction which is at an angle with respect to the rack fore-and-aft direction, such that, when the angular view camera captures an image of the detected member while the article transfer device is assumed to be at the standard proper position relative to the storage unit, the image of the detected member is located at a set reference position within the image taken, and such that the frontal view camera and the angular view camera are removably attached to the article transfer device as a unit;

performing an imaging operation wherein the article transfer device is caused to be moved to the target stop position for each of the plurality of the storage unit in turn, and operations of the frontal view camera, the angular view camera and of at least one of the vertically movable lift and the horizontal travel carriage are controlled to cause the frontal view camera and the angular view camera to capture an image while the article transfer device is at the target stop position;

deriving rack lateral width direction correction information and vertical direction correction information for bringing the target stop position closer to the standard proper position in the rack lateral width direction and the vertical direction, and extending and retracting distance correction information for bringing the target extending and retracting distance closer to a proper extending and retracting distance based on an image information from the frontal view camera and an image information from the angular view camera, and performing a calculation to obtain the target stop position and target extending and retracting distance for each of the plurality of storage units based on the derived rack lateral width direction correction information, the vertical direction correction information, and the extending and retracting distance correction information, wherein, the detected member has a rectangular detected surface that extends along a front plane of the storage rack, and a vertical position of the detected member is determined based on positions of vertical ends of the detected member on an image captured by the frontal view camera, and a lateral position of the detected member is determined based on positions of lateral ends of the detected member on the image captured by the frontal view camera, and a position of the detected member is determined based on positions of lateral ends of the detected member on an image captured by the angular view camera;

wherein the vertical direction correction information is derived in the calculating step based on an amount of deviation between the set reference position and the position of the detected member, in a direction corresponding to the vertical direction, in the frontal view image captured by the frontal view camera, and the rack lateral width direction correction information is derived in the calculating step based on an amount of deviation between the set reference position and the position of the detected member, in a lateral direction corresponding to the rack lateral width direction;

wherein the extending and retracting distance correction information is derived based on the amount of deviation between the set reference position and the position of the detected member in a direction corresponding to the displacement direction in an image captured by the frontal view camera, the amount of deviation between the set reference position and the position of the detected member in a direction corresponding to the displacement direction in an image captured by the angular view camera, and angle of intersection information between an optical axis of the frontal view camera and an optical axis of the angular view camera.

9. A learning method for an article storage facility having an article storage rack including a plurality of article storage units arranged in a rack lateral width direction and in a vertical direction, and an article transfer device configured to be moved, by a vertically movable lift and a horizontal travel carriage associated with the vertically movable lift, to each of target stop positions, each of which is a position defined, in association with one of the plurality of the storage units, in the rack lateral width direction, the vertical direction, and a rack fore-and-aft direction, wherein an article is transferred to and from a storage unit by moving an article support provided to the article transfer device in the rack fore-and-aft direction by a target extending and retracting distance while the article transfer device is stopped at a target stop position, the method comprising:

positioning a frontal view camera with respect to the article transfer device such as to capture an image of a detected member provided in association with each of the storage units from the rack fore-and-aft direction, and such that, when the frontal view camera captures an image of the detected member while the article transfer device is assumed to be at a standard proper position relative to a storage unit with respect to each of the rack lateral width direction, the vertical direction, and the rack fore-and-aft direction, which is an appropriate position for an article transfer, the image of the detected member is located at a set reference position within the image taken;

positioning an angular view camera with respect to the article transfer device such as to be displaced with respect to the frontal view camera in a displacement direction which is either the rack lateral width direction or the vertical direction to capture an image of the detected member from a direction which is at an angle with respect to the rack fore-and-aft direction, such that, when the angular view camera captures an image of the detected member while the article transfer device is assumed to be at the standard proper position relative to the storage unit, the image of the detected member is located at a set reference position within the image taken, and such that the frontal view camera and the angular view camera are removably attached to the article transfer device as a unit;

performing an imaging operation wherein the article transfer device is caused to be moved to the target stop position for each of the plurality of the storage unit in turn by vertically moving the vertically movable lift which extends longer than the article storage rack in the rack lateral width direction, and by moving along the rack lateral width direction the horizontal travel carriage configured to be guided and supported by the vertically movable lift, and to support the article transfer device, and wherein operations of the frontal view camera, the angular view camera and of at least one of the vertically movable lift and the horizontal travel carriage are controlled to cause the frontal view camera and the angular view camera to capture an image while the article transfer device is at the target stop position;

deriving rack lateral width direction correction information and vertical direction correction information for bringing the target stop position closer to the standard proper position in the rack lateral width direction and the vertical direction, and extending and retracting distance correction information for bringing the target extending and retracting distance closer to a proper extending and retracting distance based on an image information from the frontal view camera and an image information from the angular view camera, and performing a calculation to obtain the target stop position and target extending and retracting distance for each of the plurality of storage units based on the derived rack lateral width direction correction information, the vertical direction correction information, and the extending and retracting distance correction information, wherein, the detected member has a rectangular detected surface that extends along a front plane of the storage rack, and a vertical position of the detected member is determined based on positions of vertical ends of the detected member on an image captured by the frontal view camera, and a lateral position of the detected member is determined based on positions of lateral ends of the detected member on the image captured by the frontal view camera, and a position of the detected member is determined based on positions of lateral ends of the detected member on an image captured by the angular view camera;

wherein the vertical direction correction information is derived in the calculating step based on an amount of deviation between the set reference position and the position of the detected member, in a direction corresponding to the vertical direction, in the frontal view image captured by the frontal view camera, and the rack lateral width direction correction information is derived in the calculating step based on an amount of deviation between the set reference position and the position of the detected member, in a lateral direction corresponding to the rack lateral width direction;

wherein the extending and retracting distance correction information is derived based on the amount of deviation between the set reference position and the position of the detected member in a direction corresponding to the displacement direction in an image captured by the frontal view camera, the amount of deviation between the set reference position and the position of the detected member in a direction corresponding to the displacement direction in an image captured by the angular view camera, and angle of intersection information between an optical axis of the frontal view camera and an optical axis of the angular view camera.

* * * * *